(12) United States Patent
Nishiyama et al.

(10) Patent No.: US 6,572,809 B1
(45) Date of Patent: Jun. 3, 2003

(54) GEL COATING METHOD AND APPARATUS

(75) Inventors: Yugo Nishiyama, Hyogo (JP); Yasushi Kohno, Hyogo (JP)

(73) Assignee: Agritecno Yazaki Co., Ltd., Hyogo (JP)

( * ) Notice: Subject to any disclaimer, the term of this patent is extended or adjusted under 35 U.S.C. 154(b) by 0 days.

(21) Appl. No.: 09/959,369

(22) PCT Filed: Apr. 23, 1999

(86) PCT No.: PCT/JP99/02203

§ 371 (c)(1),
(2), (4) Date: Oct. 17, 2001

(87) PCT Pub. No.: WO00/64233

PCT Pub. Date: Nov. 2, 2000

(51) Int. Cl.$^7$ ............................. B29C 39/10; B29C 70/70
(52) U.S. Cl. ..................... 264/279.1; 264/299; 425/93; 425/117; 425/270
(58) Field of Search ........................... 425/93, 117, 270; 264/279, 279.1, 299, 301, 304, 306, 313, 86

(56) References Cited

U.S. PATENT DOCUMENTS

| | | | | |
|---|---|---|---|---|
| 3,533,812 A | * | 10/1970 | Cummings et al. | 501/144 |
| 4,203,936 A | * | 5/1980 | Kiwak et al. | 264/449 |
| 4,422,990 A | * | 12/1983 | Armstrong et al. | 264/45.3 |
| RE32,476 E | * | 8/1987 | Kistner | 405/264 |
| 4,779,376 A | * | 10/1988 | Redenbaugh | 47/57.6 |
| 4,780,987 A | * | 11/1988 | Nelsen et al. | 47/57.6 |
| 4,801,553 A | * | 1/1989 | Owen et al. | 436/174 |
| 4,927,600 A | * | 5/1990 | Miyashita et al. | 419/49 |
| 4,931,241 A | * | 6/1990 | Freitag | 264/86 |
| 5,080,925 A | | 1/1992 | Kouno | |
| 5,135,690 A | * | 8/1992 | Imura et al. | 264/621 |
| 5,701,700 A | * | 12/1997 | Kohno et al. | 47/57.6 |
| 5,706,602 A | * | 1/1998 | Kohno et al. | 47/57.6 |
| 5,725,662 A | * | 3/1998 | Nakatsukasa et al. | 118/13 |
| 5,783,250 A | | 7/1998 | Kohno | |
| 5,791,084 A | * | 8/1998 | Kohno et al. | 41/57.6 |

FOREIGN PATENT DOCUMENTS

| | | |
|---|---|---|
| JP | 2-128611 | 5/1990 |
| JP | 9-149710 | 6/1997 |

* cited by examiner

*Primary Examiner*—Angela Ortiz
(74) *Attorney, Agent, or Firm*—Knobbe, Martens, Olson & Bear LLP

(57) ABSTRACT

A gel coating method comprising making a mold (27), which has both a gelatinizer impermeability or a slight gelatinizer impermeability and a hardening agent permeability, retain a hardening agent (26) thereon beforehand by immersing the mold (27) in the hardening agent (26) and taking out the mold (27) therefrom, placing a gelatinizer (30) and an object to be sealed (9) in the resultant mold (27), allowing the hardening agent (26) to permeate through the mold (27) as a whole by immersing the mold in the hardening agent (26) again, and uniformly hardening the gelatinizer (30), which is around the object to be sealed (9), from the portion thereof which contacts the mold (27), whereby the object to be sealed (9) is rendered easily removable as gel-coated object (9a) from the mold (27).

12 Claims, 7 Drawing Sheets

US 6,572,809 B1

GEL COATING METHOD AND APPARATUS

This application is the U.S. National Phase under 35 U.S.C. §371 of International Application PCT/JP99/02203, filed Apr. 23, 1999. The International Application was not published under PCT Article 21(2) in English.

TECHNICAL FIELD

The present invention relates to a method and apparatus for coating with a gelatinizer an object having a growth ability such as a seed, a cell piece or the like having a germinating or rooting ability, and more particularly to a gel coating method and apparatus also capable of gel-coating a heavy seed or a seed having a poor germinating ability.

BACKGROUND ART

Conventionally, a coated object obtained by coating such an object to be sealed as a seed, a cell piece or the like with a macromolecular gel containing nutriments, medicament and the like and being elastic (hereinafter generically, the object to be sealed is called a "seed" and the coated object is called a "coated seed"; and that is, hereinafter in case of referring to a "seed" or a "coated seed", the "seed" means not only a seed but also any object having a growth ability such as a cell piece having a germinating or rooting ability) is known. The coated seed has many advantages such as that the coated seed is effective to protect the seed from being eaten by animals or sterilize the seed, that it makes it easy to handle the seed by making the seed larger in grain diameter and thereby makes its seeding operation more efficient, and that furthermore it enables to improve its germination rate due to absorbing nutriments in the macromolecular gel.

By the way, as a typical method for automatically manufacturing above-mentioned coated seed, there are a double-cylinder nozzle method and a mold method.

First, a double-cylinder nozzle method is explained with reference to FIG. 7. This method slightly pressurizes the inside of a gel accommodating portion 3 of a gel accommodating block 2 into which a gelatinizer is supplied from a gelatinizer tank, not shown, by means of an air cylinder, not shown, fills a passage 4 of the gel accommodating portion 3 and a space 5 communicating with the passage 4 with the gelatinizer as well as raises the pressure inside the space 5, and thereby moves upwardly a cylindrical plunger 6 mounted so as to be moved up and down inside of a nozzle block 1 against the elastic force of a coil spring 7 provided on the top end of the plunger 6, and slightly opens a valve 8 and discharges the gelatinizer to form a thin film of the gelatinizer on the lower end of the valve 8. After that, this method throws a seed 9 into a passage 6a of above-mentioned plunger 6 and makes above-mentioned thin film hold the seed 9 and then further pressurizes the inside of above-mentioned gel accommodating portion 3 to raise the internal pressure of the space 5, and thereupon above-mentioned valve 8 is greatly opened and a great amount of gelatinizer is discharged and the gelatinizer wraps the seed 9 in it in cooperation with above-mentioned film, and when a grain-shaped gel-coated seed 9a is formed thereby, the gel-coated seed 9a is dropped due to its own weight into an lower hardening tank, not shown, containing a hardening agent. The gel part of the gel-coated seed 9a is hardened while being conveyed through the hardening tank, and the hardening agent is washed away in a water-washing portion to form a product.

However, such a double-cylinder nozzle method has a disadvantage that in case of gel-coating a heavy seed such as corn, bean and the like, it cannot be gel-coated in some cases because above-mentioned thin film of the gelatinizer is broken by the shock of dropping of the seed. In order to prevent the break of the thin film, it is conceivable to raise the viscosity of the gelatinizer, but a problem has occurred that since the gel coating layer is made harder by doing so, the seed is difficult to germinate. Moreover, there has been a problem that in case of gel-coating a seed having a poor germinating ability, it is necessary to make the viscosity of the gelatinizer as low as possible in order to obtain a sufficiently high germinating ability, but in a double-cylinder nozzle method a spreadable viscosity of the thin film has the lower limit which has sometimes made a gel-coating process impossible. Furthermore, when above-mentioned gel-coated seed 9a is dropped due to its own weight into a lower hardening tank, a hardening agent spattered onto the lower end of above-mentioned nozzle block 1 has sometimes made a gel-coating process impossible.

Next, a mold method is a method which throws a seed into a mold whose inner face is spherical and at the same time fills the mold with a gelatinizer and a hardening agent, and takes out the gel-coated seed from the mold after it has been hardened. In this case, since this method does not use a stretched thin film of a gelatinizer to support a seed differently from above-mentioned double-cylinder nozzle method, it has an advantage that the gelatinizer does not need to be made higher in viscosity in order to enforce the seed supporting ability and its viscosity can be freely set to an adequate degree to provide a high efficiency of germination. However, there has been a problem that since a gelatinizer is difficult to be released from a mold, a seed cannot be coated in the shape of a sphere in some cases, and in the worst case a gel-coated seed cannot be released from the mold. Further, there has been a problem that this method is disadvantageous in work efficiency due to necessity of an operation of removing a hardening agent or a gelatinizer stuck to a mold each time a gel-coating process is performed.

DISCLOSURE OF THE INVENTION

The present invention provides a gel coating method obtained by improving above-mentioned mold method, which gel coating method injects a gelatinizer and an object to be sealed into a mold having both a gelatinizer impermeability or a slight gelatinizer impermeability and a hardening agent permeability, allows a hardening agent to permeate throughout the mold by immersing the mold in the hardening agent, and uniformly hardens the gelatinizer, which is around above-mentioned object to be sealed, from its contacting part with the mold, and thereby renders the object to be sealed easily removable as a gel-coated object from the mold. This method can securely coat with gel even a heavy object to be sealed or an object to be sealed having a poor germinating ability since it does not support an object to be sealed with a thin film of a gelatinizer. Moreover, since hardening of a gelatinizer proceeds in order from the contacting part with a mold, no unhardened gelatinizer is stuck to the inner face of the mold and the mold releasability of a gel-coated object is remarkably improved in comparison with a conventional mold method, and it is possible also to suppress remaining of a gelatinizer in a mold.

Moreover, since a thin hardened layer of a gelatinizer is formed beforehand at a contacting part between a gelatinizer and a mold by making above-mentioned mold retain the hardening agent through immersing the mold in the hardening agent and taking out the mold before injecting the gelatinizer and an object to be sealed into the mold, it is possible to further improve a gel-coated object in mold releasability.

The inner face of a mold used in above-mentioned method is composed of a semispherical portion projecting downward and a cylindrical portion set upright on the spherical portion, and the whole depth from the top end of the cylindrical portion to the bottom end of the semispherical portion is made equal to or greater than the diameter of above-mentioned semispherical portion, and therefore a gel-coated object can be surely made sphere-shaped.

Further, in case of using a mold having a slight gelatinizer impermeability as above-mentioned mold, since one that is composed such that it takes a time of one or more seconds for a gelatinizer to permeate through the mold, it is possible to completely prevent the gelatinizer injected into the mold from leaking out before immersing the mold in a hardening agent.

Moreover, it is acceptable also to use a mold made of an elastic material as above-mentioned mold, transform the mold by pressing its lower part from below, and extrude a gel-coated object in the mold into the hardening agent, and then restore the mold to its original shape, and in this case it is possible to more quickly release the gel-coated object from the mold by the mechanical extrusion in addition to above-mentioned hardening.

And, this method limits the thickness of a hardened layer formed by reaction of a gelatinizer injected into above-mentioned mold upon the hardening agent retained beforehand in the mold to 20% or less of the radius of a semispherical portion forming the lower part of the mold and projecting downward. Therefore, since the gel-coated object proceeds in globing by a surface tension as suspending in the hardening agent, it is possible to make the gel-coated object more completely sphere-shaped.

And the present invention provides a gel coating apparatus suitable for using the gel coating method. That is, a gel coating apparatus according to the present invention comprises a mold which has both a gelatinizer impermeability or a slight gelatinizer impermeability and a hardening agent permeability, an object to be sealed feeding means for throwing a specific number of objects to be sealed into the mold, a gelatinizer feeding means for discharging an adequate amount of gelatinizer for applying to the object to be sealed, a hardening tank which is disposed below the gelatinizer feeding means and the object to be sealed feeding means and is filled with a hardening agent, a mold immersing means which can consecutively immerse molds in the hardening tank and take out the molds from the tank, and a gel-coated object collecting means for taking out a gel-coated object which is released from the mold and suspends in the hardening agent from the hardening tank, which gel coating apparatus immerses the mold having a gelatinizer and an object to be sealed injected in it by the object to be sealed feeding means and the gelatinizer feeding means in a hardening agent inside the hardening tank and thereby makes the hardening agent permeate throughout the mold to harden the surface of the gelatinizer in the mold and releases the gel-coated object from the mold.

According to this apparatus composition, a gelatinizer and an object to be sealed are injected into a mold respectively by an object to be sealed feeding means and a gelatinizer feeding means, and the mold is immersed in a hardening tank and is taken out from the tank, and at this time, since the gelatinizer in the mold starts to be hardened uniformly from the contacting part with the mold by the hardening agent which has permeated throughout the mold, the gel-coated object is easily released from the mold and is collected by a gel-coated object collecting means. Since this apparatus does not have a structure which holds an object to be sealed with a thin film of a gelatinizer, it can surely gel-coat even a heavy object to be sealed or an object to be sealed having a poor germinating ability, and further since hardening of a gelatinizer proceeds in order from the contacting part with the mold, no unhardened gelatinizer is stuck to the inner face of the mold and the mold releasability of a gel-coated object is remarkably improved and the remaining of a gelatinizer in the mold can be also suppressed.

The gel-coated collecting means comprises two pulleys arranged in the longitudinal direction, a belt wound around the pulleys, and a plurality of paddles stood upright on the outer face of the belt, and the paddles are moved in the hardening tank as one body with the belt by rotation of the pulleys to generate a circulating flow, transfer gel-coated objects suspending in the liquid surface, and scoop up and discharge a gel-coated object transferred to the terminal to the outside. According to this composition, since generation of a circulating flow for transferring gel-coated objects suspending and discharge of gel-coated objects which have been hardened can be performed by a single means having a simple structure, it is possible to attain manufacturing cost reduction and space saving by reduction of the number of devices.

And the mold immersing means comprises an upper pulley arranged near the gelatinizer feeding means and the object to be sealed feeding means and near the liquid surface of the hardening agent in the hardening tank, a lower pulley arranged distantly from the upper pulley and deeply in the hardening agent, and a mold built-in belt wound around the upper and lower pulleys, and the mold built-in belt has a plurality of molds whose openings face outward embedded in it. According to this composition, since it is possible to consecutively perform a gel coating process, the efficiency of work can be remarkably improved.

BEST MODE FOR CARRYING OUT THE INVENTION

Next, embodiments of the present invention are described with reference to the drawings. The present invention is not limited to these embodiments, but covers widely the whole scope of a technical idea really intended by the present invention which will be made apparent from the whole description of this specification and the accompanying drawings.

Figure 1:
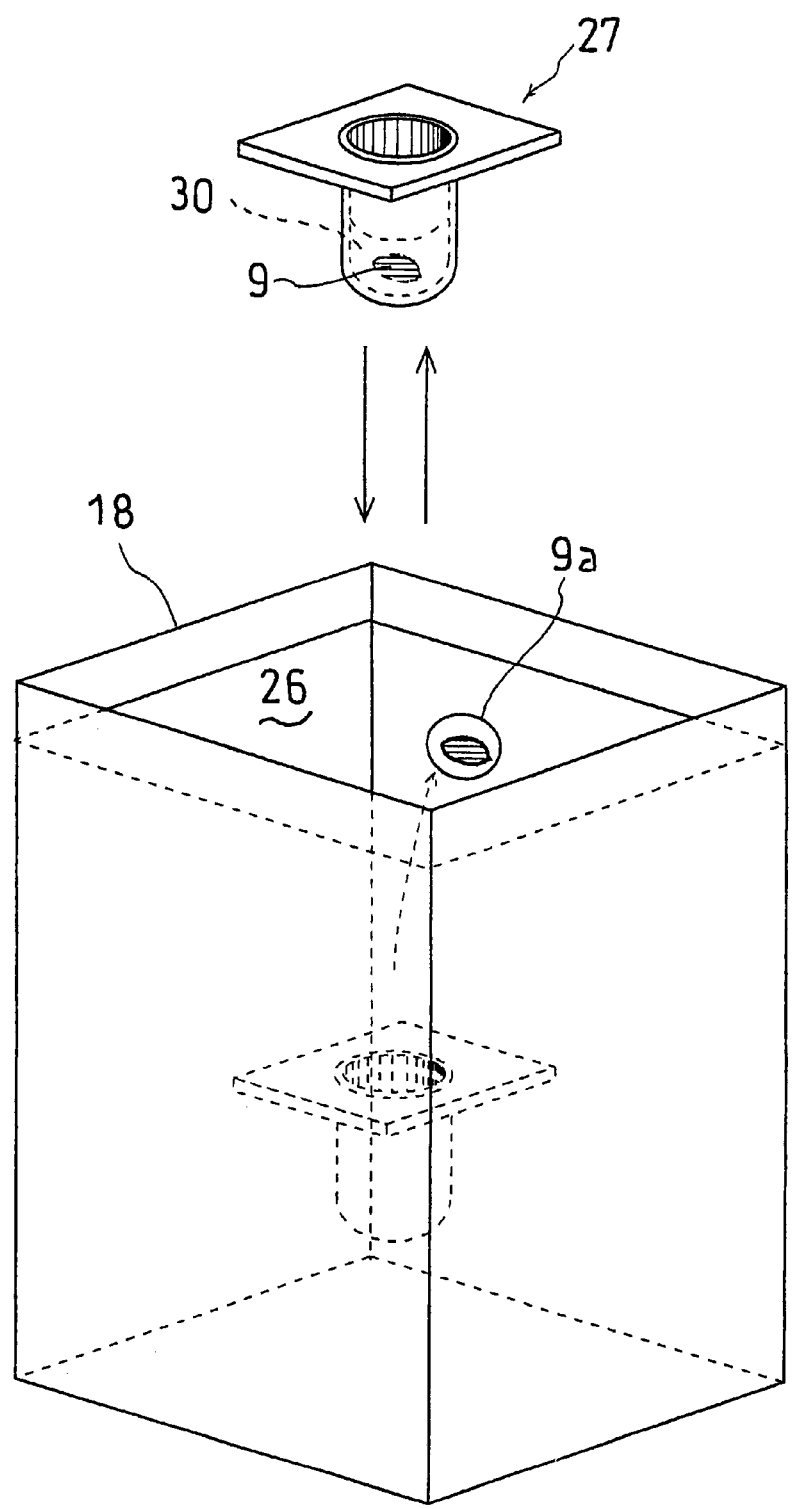
FIG. 1 is a perspective view of a main part of a gel coating apparatus according to the present invention, showing a gel coating method according to the present invention.

First, a main part of a gel coating apparatus adopting an improved mold method of the present invention and an outline of a gel coating method performed in the main part of the apparatus are described with reference to FIGS. 1 and 2. As shown in b) of FIG. 2, a gelatinizer 30 and a seed 9 being an object to be sealed are injected into a mold 27 according to the present invention having both a gelatinizer impermeability or a slight gelatinizer impermeability and a hardening agent permeability. As shown in c) of FIG. 2, when the mold 27 is immersed in a liquid hardening agent 26 filling a hardening tank 18, the hardening agent 26 starts permeating into the inside of the mold 27 not only from the upper opening 27a of the mold 27 but also through the wall 27b of the side and the bottom. When the peripheral part of a gel-coated seed 9a is hardened and contracted by the hardening agent, the hardened outermost face is released from the inner wall of the mold 27. The released gel-coated seed 9a is made grain-shaped by action of a surface tension and is raised to the surface of the hardening agent 26 by a buoyant force, as shown in d) of FIG. 2, due to a small specific gravity of the gel portion.

Figure 2:
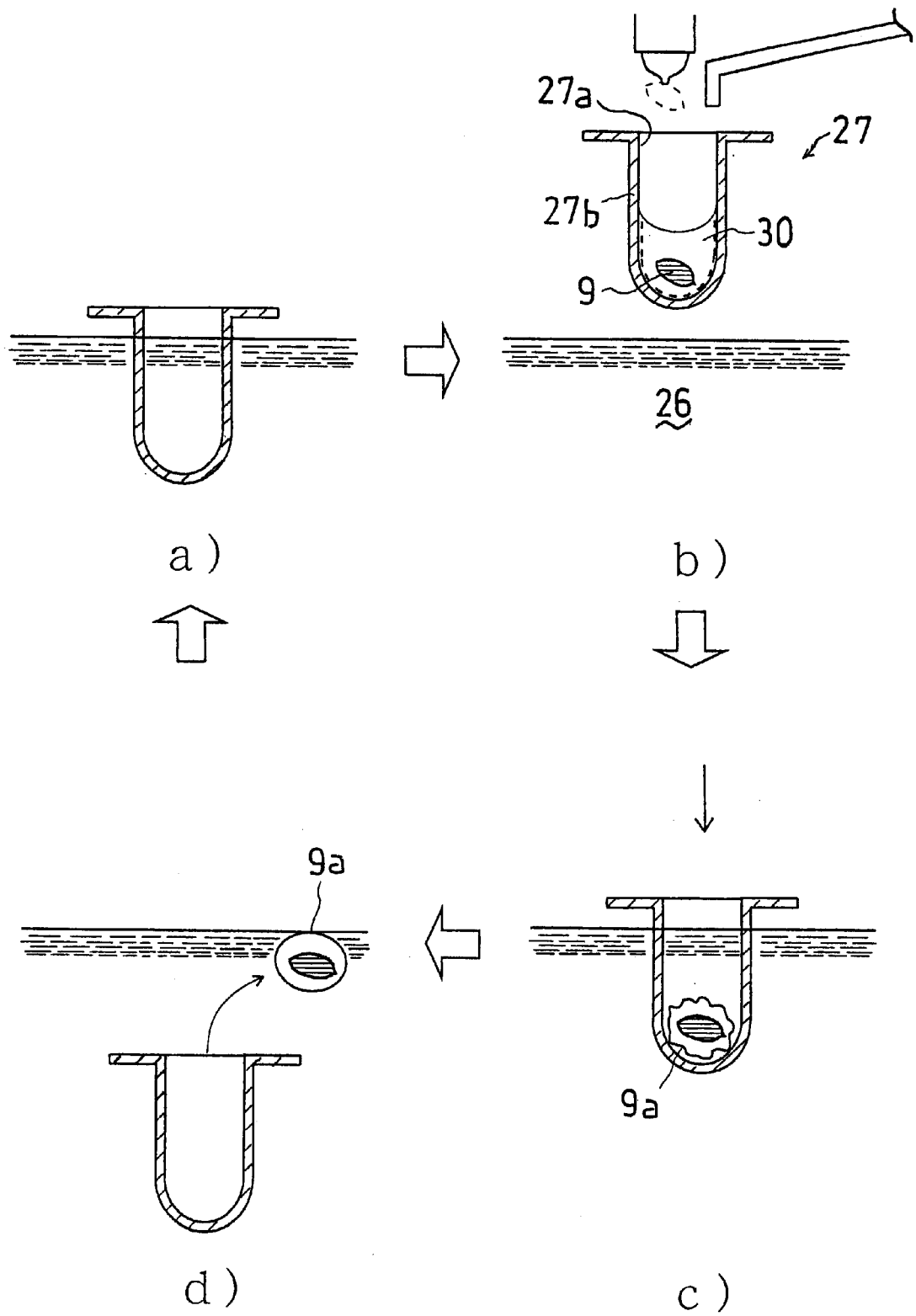
FIG. 2 shows explanatory diagrams showing a procedure of a gel coating process in the main part of the gel coating apparatus, and a) is an explanatory diagram showing a state where a mold is immersed in a hardening agent in advance, b) is an explanatory diagram showing a state where a seed and a gelatinizer are injected in a mold, c) is an explanatory diagram showing a state where a hardening agent has permeated into the inside of the mold, and d) is an explanatory diagram showing a state where a gel-coated seed has been released from the mold.

By immersing the mold 27 in the hardening agent 26, taking out the mold 27 from the hardening agent and making the mold 27 retain the hardening agent 26 in it in advance, as shown in a) of FIG. 2, before injecting the gelatinizer 30 and a seed 9 being an object to be sealed into the mold 27, the injected gelatinizer 30 and the retained hardening agent 26 react upon each other, and a thin hardened layer of the gelatinizer is formed in the contacting part with the inner face of the mold and thereby the releasability of the gel-coated seed 9a from the inner face of the mold 27 can be more improved.

Figure 7:
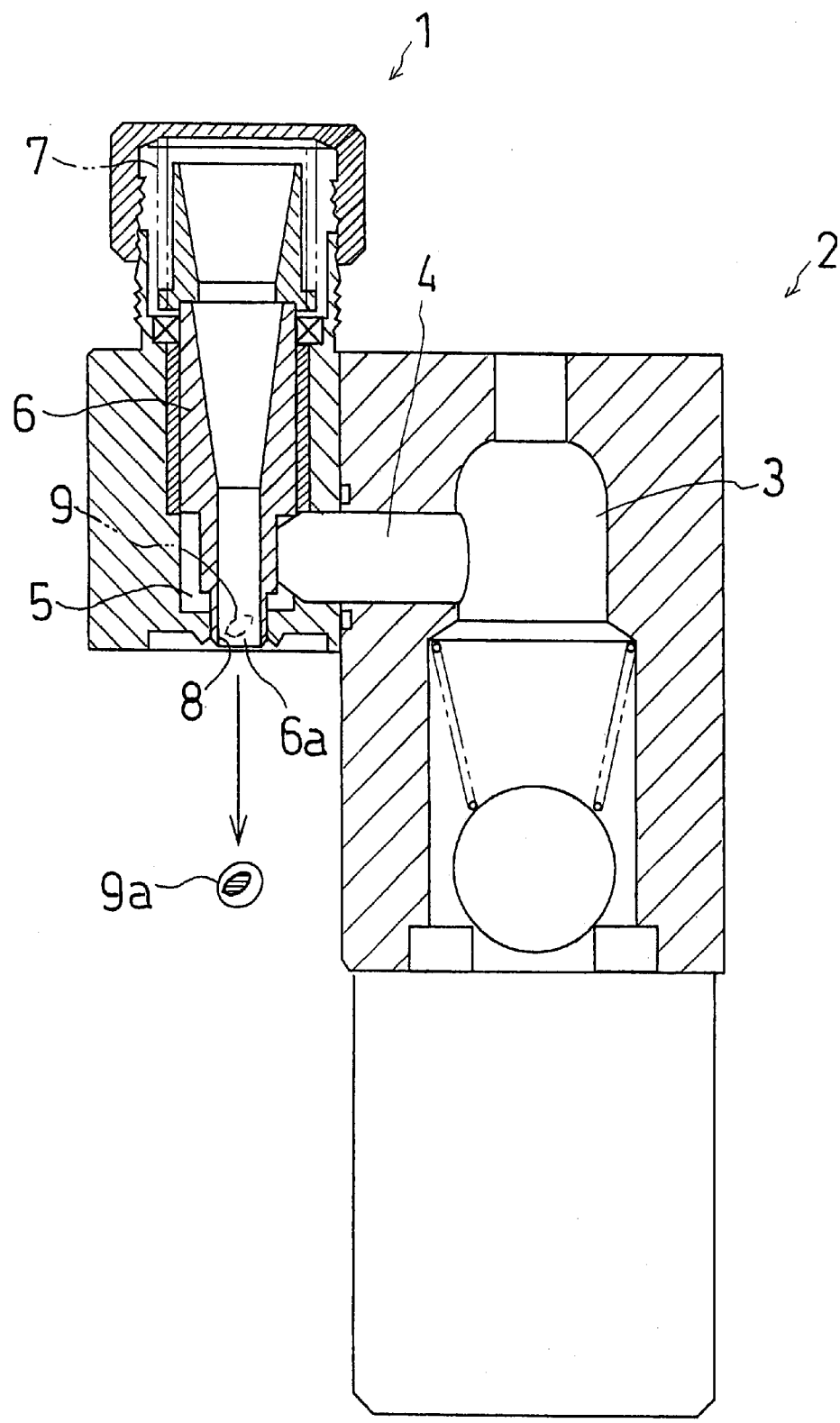
FIG. 7 is a side view, partially in cross-section, of a main part of a conventional gel coating apparatus using a double-cylinder nozzle method.

Since a gel coating method according to the present invention utilizes a mold method and originally does not need to support a seed 9 with the thin film of the gelatinizer 30 differently from the double-cylinder nozzle method using the apparatus shown in FIG. 7, this method can greatly expand an applicable range of the weight of a seed 9 or the viscosity of a gelatinizer 30, and further since the hardening agent 26 permeates into the inside of the mold 27 through the whole mold wall and hardens the gelatinizer 30 in order from the contacting part with the mold 27, the mold releasability of a gel-coated seed 9a is remarkably improved in comparison with the prior art mold method and remaining of the gelatinizer 30 on the inner face of the mold 27 can be also prevented.

Figure 3:
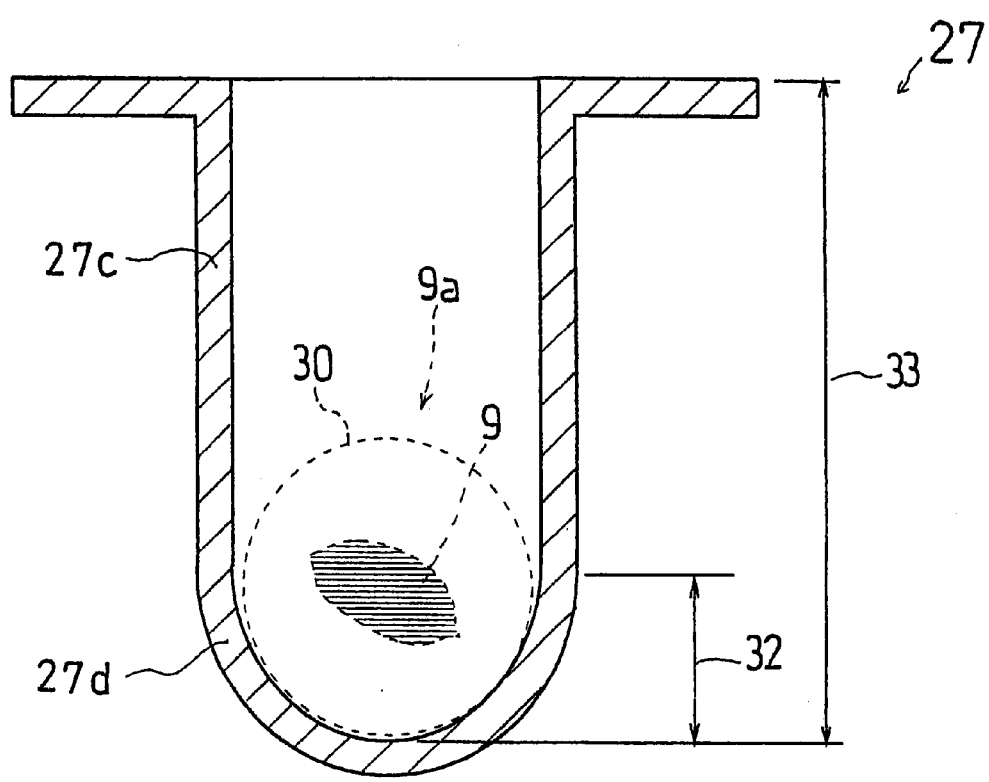
FIG. 3 is a side sectional view of a mold.

Next, the shape and characteristics of a mold 27 used in the present invention are described with reference to FIGS. 3 and 4. Although the shape of the inner face of the mold 27 is not particularly limited, as shown in FIG. 3 the mold is preferably composed of a semispherical portion 27d projecting downward and a cylindrical portion 27c set upright on the semispherical portion 27d in order to form a spherical gel-coated seed 9a. Particularly, the whole depth 33 from the top of the cylindrical portion 27c to the bottom of the semispherical portion 27d is preferably secured to be double or more than the radius 32 of the semispherical portion, namely, equal to or greater than the diameter of it. The reason is that when the whole depth 33 is shallower than the diameter, a soft gel-coated seed 9a projects from the top of the mold 27 on the way of hardening and is liable to transform due to a fact that the projecting portion receives the resistance of liquid flow and the like and further it is not possible to secure a necessary amount of gelatinizer 30 for globing.

And the gelatinizer 30 in the mold 27 needs to be impermeable or slightly impermeable in permeability, and the reason is that the gelatinizer 30 injected into the mold 27 is prevented from leaking out. In case of a slight impermeability, allowing for a time from when feeding the gelatinizer 30 into the mold 27 to when immersing the mold 27 in the hardening agent 26, it takes preferably one or more seconds for the gelatinizer 30 to permeate through the mold 27. The reason is that if it is shorter than this, there is the possibility that the gelatinizer 30 fed in the mold 27 leaks out before the mold 27 is immersed in the hardening tank 18.

Further, the mold 27 is preferably an elastic body which is easily transformed by being pressed from downward to press out a gel-coated seed 9a being inside the mold 27 from the mold 27 and then can be immediately restored to its original shape, and thereby a mechanical pressing-out force can be added to a buoyant force and the mold releasability can be more improved.

Figure 4:
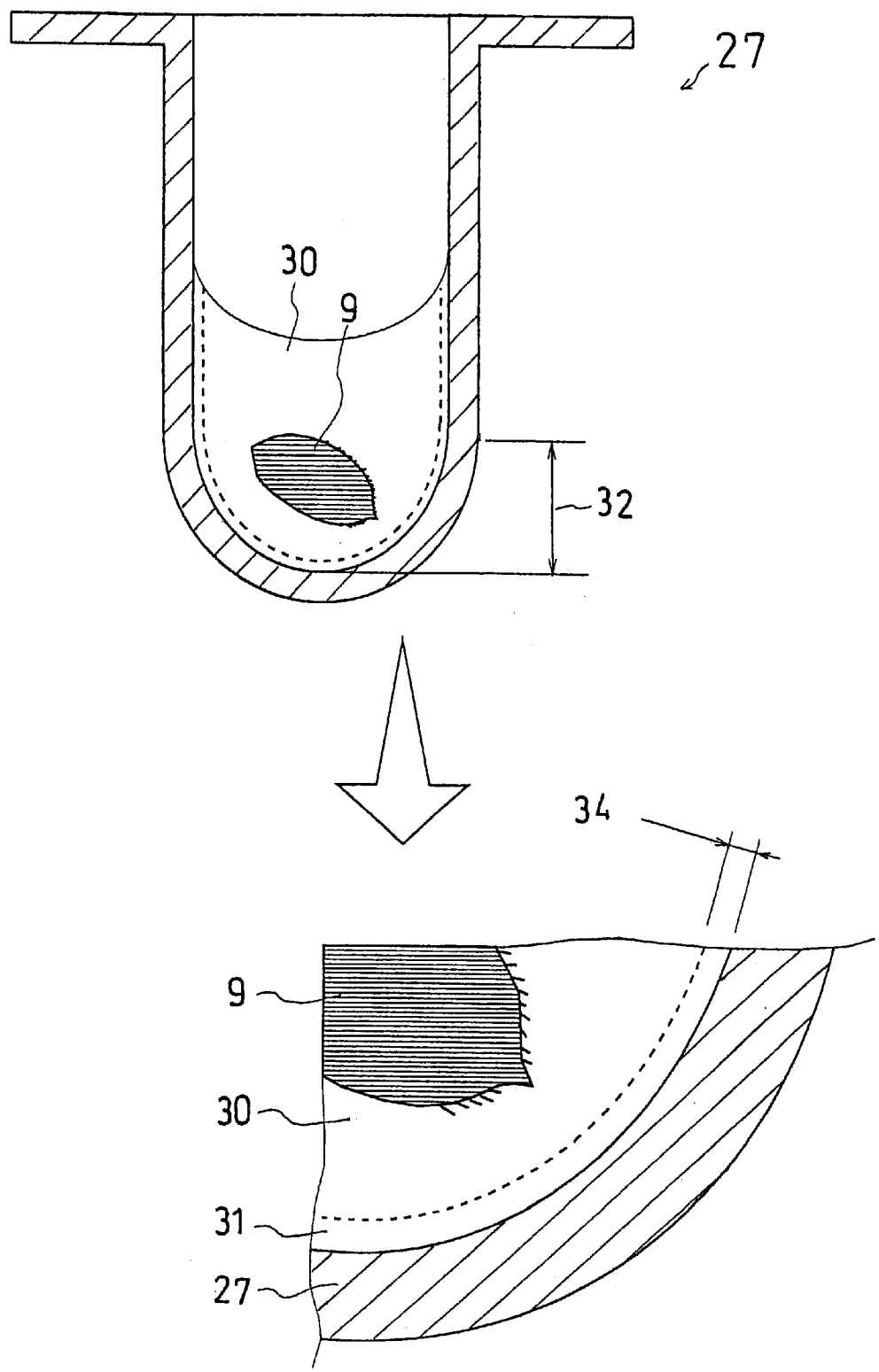
FIG. 4 is a side sectional view of a mold having a gelatinizer and a seed injected in it.

And in case of immersing the mold 27 in the hardening agent 26, taking out the mold 27 from the hardening agent 26 and retaining the hardening agent in the mold 27 in advance, it is preferable to limit the thickness 34 of a hardened layer 31 of the gelatinizer 30 formed by reacting upon the hardening agent 26 in the mold 27 to 20% or less of the radius 32, as shown in FIG. 4. The reason is that if the hardening proceeds to the inner part and the thickness of the hardened layer 31 exceeds 20% of the radius 32, globing by a buoyant force during suspending in the hardening agent 26 does not occur, and hardening of the gel portion is finished as it is left in the shape of the inner face of the mold 27 and as a result, a spherical gel-coated seed 9a cannot be obtained.

Thereupon, on the basis of reactivity of the hardening agent 26 upon the gelatinizer 30 and the permeability of the mold 27 to the hardening agent 26, by selecting a raw material for the hardening agent 26 or an additive to it, setting the concentration of the hardening agent 26, or setting a time of immersing a gel-coated seed 9a in the hardening agent 26 until finally taking out the gel-coated seed 9a from the hardening tank 18, the thickness 34 of the hardened layer 31 is suppressed to 20% or less of the radius 32 of the semispherical portion 27d of the mold 27.

A raw material having such a gelatinizer impermeability or a slight gelatinizer impermeability, elasticity, a hardening agent permeability and retainability includes such fine porous materials as cloth of nonwoven fabric and the like, paper, sponge and wire cloth, or porous resin, metal and ceramic, but is not limited in particular and may be any material having the characteristics described above. A raw material having a shape memory ability in addition to the characteristics is effective, and for example, when using a shape memory alloy transforming its shape according to a temperature change for the mold 27 and setting the mold 27 so as to transform its bottom portion inward at a bath temperature in the hardening tank instead of transforming by pressing, a gel-coated seed 9a is pressed out from the mold 27 in the hardening tank 18 and after the mold 27 has come out from the hardening tank 18, the mold 27 is restored to its original shape due to an open-air temperature, whereby it is possible to improve the mold releasability more surely, moreover, without additionally installing new devices.

Figure 5:
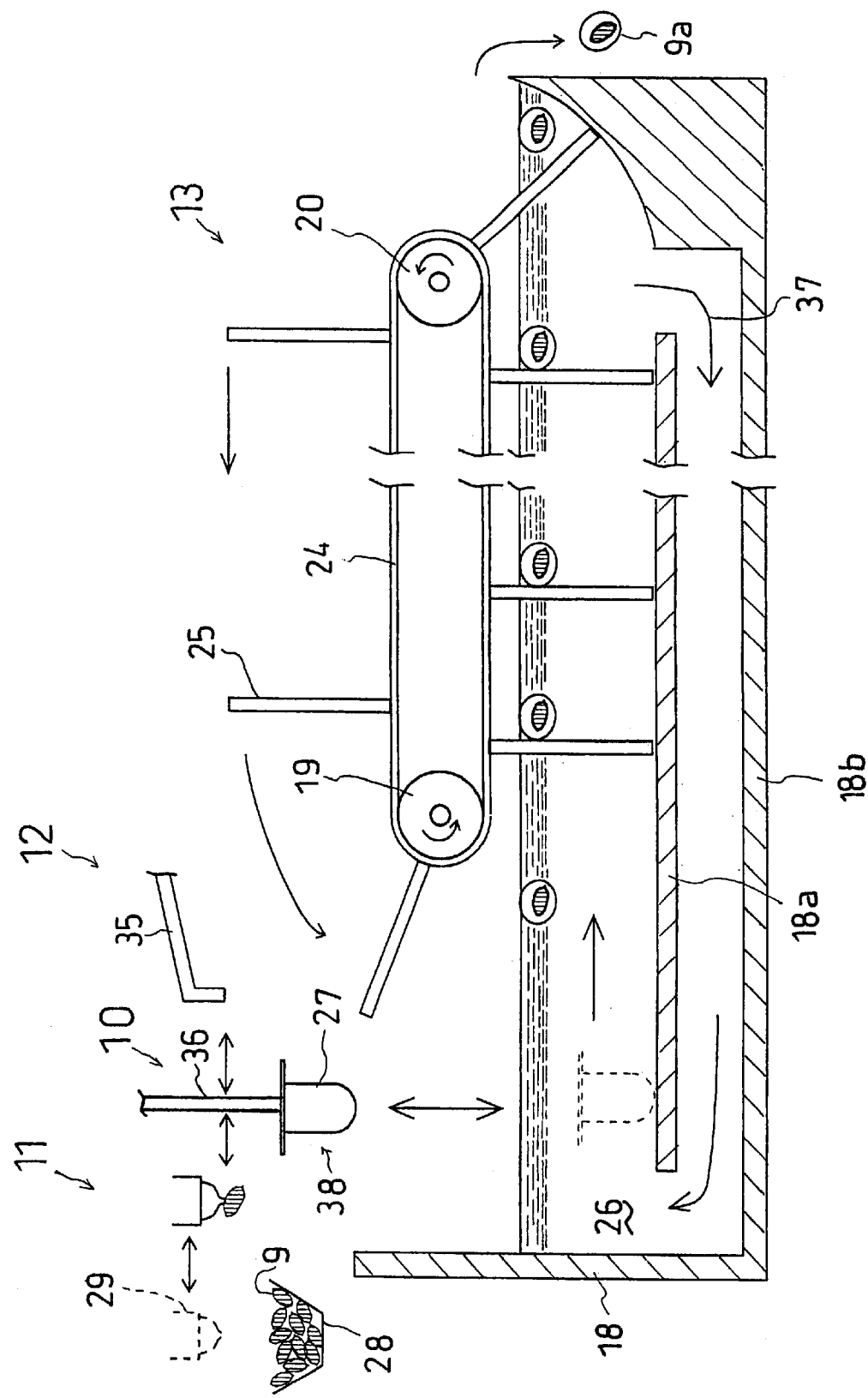
FIG. 5 is a side view, partially in cross-section, showing a rough composition of a first embodiment of a gel coating apparatus according to the present invention.

Hereupon, a first embodiment of a gel coating apparatus according to the present invention is described with reference to FIG. 5. The gel coating apparatus comprises a mold 27, an object to be sealed feeding means 11, a gelatinizer feeding means 12, a mold immersing means 10, a hardening tank 18 and a gel-coated object collecting means 13.

Among them, the object to be sealed feeding means 11 is composed of a seed hopper 28 accommodating a number of objects to be sealed such as seeds 9 and the like, a suction chip 29 detachably attached to the lower face of an unshown arm supported turnably in a horizontal plane, and the like, and the suction chip 29 is composed so as to be capable of horizontally going and returning above the seed hopper 28 and the mold 27 being at an injection position 38. And the gelatinizer feeding means 12 is composed of an unshown gelatinizer tank, a tube extending from the gelatinizer tank, a feeding nozzle 35 connected to the fore-end of the tube, and the like, and the feeding nozzle 35 is composed so as to be capable of horizontally going and returning to above the mold 27.

The mold immersing means 10 is composed of a swaying arm 36 coupled to the mold 27 and the like, and the swaying arm 36 is swayed up and down by an unshown actuator between below the liquid surface of the hardening tank 18 and the injection position 38 above the hardening tank 18.

The gel-coated object collecting means 13 is composed of two pulleys 19 and 20 arranged in the longitudinal direction, a belt 24 wound around the pulleys 19 and 20 and paddles 25, 25 and so on which are set upright on the outer face of the belt 24. The paddles 25, 25 and so on are moved through the hardening tank 18 by rotation of the pulleys 19 and 20, generate a circulating flow 37 shown by an arrow in the figure, transfer gel-coated seeds 9a released from the mold 27 and suspending in the liquid surface, and scoop up them at the terminal and discharge them to the outside. And in the hardening tank 18, a middle plate 18a is provided horizontally at a fixed height from a bottom plate 18b, and stabilizes the circulating flow 37. In case of forming the mold 27 out of an elastic body as described above, the middle plate 18a may be used as a member for pressing up the bottom of the mold 27 immersed in the hardening agent 26 by the mold immersing means 10.

In a gel coating apparatus having such a composition, a gel coating process can be performed by the following procedure. First, when the mold 27 is at the injection position 38, the feeding nozzle 35 is moved to above the mold 27 and injects the gelatinizer 30 into the mold 27, and when the feeding nozzle 35 comes back to a specified position from above the mold 27, the suction chip 29 sucking and holding a seed 9 in the seed hopper 28 is moved in turn to above the mold 27 and throws the seed 9 into the mold 27, and when the suction chip 29 comes back to its specified position, the feeding nozzle 35 is moved again to above the mold 27 and injects the gelatinizer 30 into the mold 27.

The mold 27 having the gelatinizer 30 and the seed 9 injected into it is lowered by the swaying arm 36 and immersed in the hardening agent 26, and the gel is hardened, and it is possible also to enhance the mold releasability of a gel-coated seed 9a by pressing the mold 27 against the upper face of the middle plate 18a as occasion demands. When the gel-coated seed 9a is raised through the hardening agent 26 by a buoyant force and pressing force, the mold 27 returns to the injection position. Gel-coated seeds 9a generated by repeating the above procedure are carried on the circulating flow 37 generated by paddles 25, proceed in globing and hardening as being led by paddles 25, and gel-coated seeds 9a which have reached the terminal are transferred to the outside of the hardening tank 18.

Figure 6:
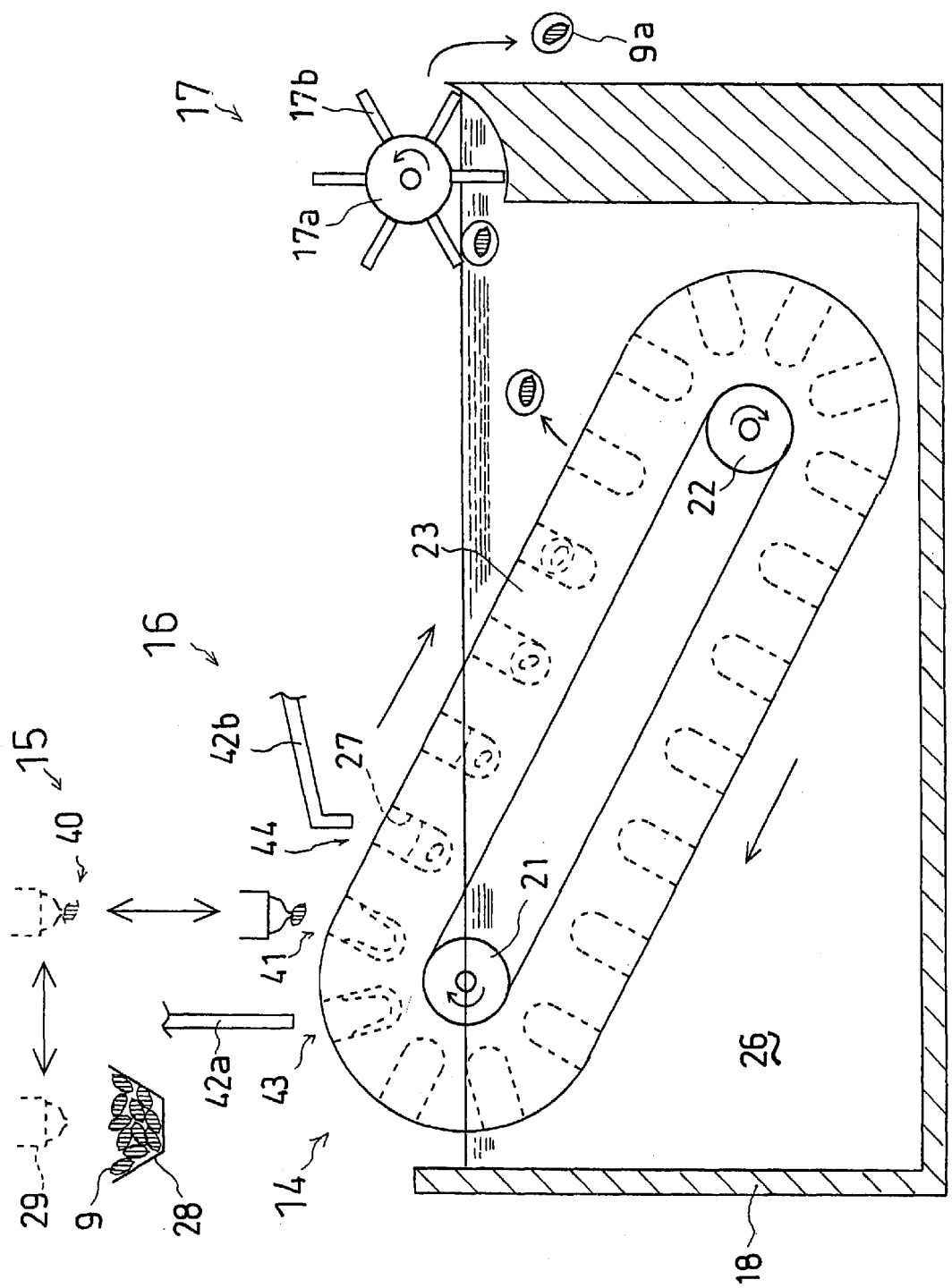
FIG. 6 is a side view, partially in cross-section, showing a rough composition of a second embodiment of the same.

Next, a second embodiment of a gel coating apparatus according to the present invention is described with reference to FIG. 6. The gel coating apparatus comprises an object to be sealed feeding means 15, a gelatinizer feeding means 16, a mold immersing means 14 having molds 27 built in it, a hardening tank 18, and a gel-coated object collecting means 17.

Among them the object to be sealed feeding means 15 is, similarly to the first embodiment, composed of a seed hopper 28 accommodating a number of objects to be sealed such as seeds 9 and the like, a suction chip 29 detachably attached to the lower face of an unshown arm supported turnably in a horizontal plane, and the like, and the suction chip 29 is composed so as to be capable of horizontally going and returning above the seed hopper 28 and a waiting position 40, and so as to be capable of swaying up and down between the waiting position 40 and a lower seed injection position 41. And the gelatinizer feeding means 16 is composed of an unshown gelatinizer tank, a tube, a reserved feeding nozzle 42a and a regular feeding nozzle 42b which are connected to the fore-end of the tube, and the like, and the reserved feeding nozzle 42a is disposed at a reserved injection position 43 in front of the seed injection position 41 and the regular feeding nozzle 42b is disposed at a regular injection position 44 at the back of the seed injection position 41.

The mold immersing means 14 is composed of an upper pulley 21 arranged near the respective injection positions 41, 43 and 44 and near the liquid surface of the hardening agent in the hardening tank 18, a lower pulley 22 arranged distantly from the upper pulley 21 and deeply from the liquid surface of the hardening agent, and a mold built-in belt 23 which is wound around the lower pulley 22 and the upper pulley 21 and which has molds 27 embedded in it whose openings face outward. And the gel-coated object collecting means 17 is composed of a turning member 17a arranged above the liquid surface at the rear part of the hardening tank 18, a plurality of blades 17b, 17b and so forth which are embedded in the outer circumferential face of the turning member 17a, and the like, the gel-coated object collecting means 17 being capable of scraping out gel-coated seeds 9a released from the molds 27 to the outside of the hardening tank 18.

In a gel coating apparatus having such a composition, a gel coating process can be performed by the following procedure. First, the mold built-in belt 23 is always turned by driving of the upper and lower pulleys 21 and 22, and in case that a mold 27 built in the mold built-in belt 23 is above the liquid surface, first the gelatinizer 30 is injected into the mold 27 by the reserved feeding nozzle 42a at the reserved injection position 43 and then at a point of time when the mold 27 has arrived at the seed injection position 41, the suction chip 29 sucking and holding a seed 9 in the seed hopper 28 lowers from the waiting position 40 to the seed injection position 41 and throws the seed 9 into the mold 27, and further, at a point of time when the mold 27 has come to the regular injection position 44, the gelatinizer 30 is injected again into the mold 27 by the regular feeding nozzle 42b.

The mold 27 having the gelatinizer 30 and the seed 9 injected into it sinks gradually into the hardening agent 26 with turning of the mold built-in belt 23 and the gel is hardened in the hardening agent 26, and a gel-coated seed 9*a* released from the mold 27 is raised through the hardening agent 36 by a buoyant force. Gel-coated seeds 9*a* generated by repeating the above procedure are carried on a flow generated by turning of the mold built-in belt 23 and, as being hardened, are transferred to the outside of the hardening tank 18. Therefore, since the present embodiment can consecutively perform a gel coating process, it is suitable for mass production, and it can optimize the hardening conditions according to the size and shape of an object to be sealed and the viscosity of a gelatinizer by adjusting a turning speed of the mold built-in belt 23.

By arranging laterally a plurality of molds 27 of the first embodiment or a plurality of mold built-in belts 23 having molds 27 built in it of the second embodiment and arranging a plurality of corresponding object to be sealed feeding means, gelatinizer feeding means and others, it becomes possible to coat a number of objects to be sealed with gel at a time, and thereby it is possible to easily cope with mass production.

INDUSTRIAL APPLICABILITY

Such a gel coating method and apparatus as described above according to the present invention can be applied to any object to be sealed having a growth ability such as a seed, a cell piece having a germinating or rooting ability, or the like, and can be applied also to an object to be sealed having any weight or an object to be sealed having any germinating ability as a method and apparatus being capable of surely performing a gel coating process. And the present invention can provide a spherical gel-coated object being excellent in mold releasability and provide a gel coating method and apparatus having a reduced amount of gelatinizer remaining in a mold.

What is claimed is:

1. A gel coating method comprising the steps of:
injecting a gelatinizer and an object to be sealed in a mold having both a gelatinizer impermeability or a slight gelatinizer impermeability and a hardening agent permeability;
permeating the hardening agent throughout the mold by immersing the mold in the hardening agent; and
hardening the gelatinizer around said object to be sealed uniformly from the contacting part with the mold and thereby making it possible for the object to be sealed to be easily released from the mold as a gel-coated object.

2. The gel coating method according to claim 1, wherein as said mold, a mold whose inner face is composed of a semispherical portion projecting downward and a cylindrical portion set upright on the semispherical portion and in which the whole depth from the top end of the cylindrical portion to the bottom end of the semispherical portion is made equal to or greater than the diameter of said semispherical portion is used.

3. The gel coating method according to claim 2, wherein as said mold, a mold whose inner face is composed of a semispherical portion projecting downward and a cylindrical portion set upright on the semispherical portion and in which the whole depth from the top end of the cylindrical portion to the bottom end of the semispherical portion is made equal to or greater than the diameter of said semispherical portion is used.

4. The gel coating method according to claim 2, wherein as said mold, a mold of a slight gelatinizer impermeability in which it takes one or more seconds for a gelatinizer to permeate through the mold is used.

5. The gel coating method according to claim 2, wherein as said mold, a mold formed out of an elastic body which is transformed by being pressed from its lower part and presses out a gel-coated object inside the mold into the hardening agent and thereafter can be automatically restored to its original shape is used.

6. The gel coating method according to claim 2, wherein the thickness of a hardened layer formed by reacting upon a hardening agent retained in advance in the mold when a gelatinizer is injected into said mold is limited to 20% or less of the radius of the semispherical portion forming the lower part of the mold and projecting downward.

7. The gel coating method according to claim 1, wherein as said mold, a mold of a slight gelatinizer impermeability in which it takes one or more seconds for a gelatinizer to permeate through the mold is used.

8. The gel coating method according to claim 1, wherein as said mold, a mold formed out of an elastic body which is transformed by being pressed from its lower part and presses out a gel-coated object inside the mold into the hardening agent and thereafter can be automatically restored to its original shape is used.

9. A gel coating method comprising the steps of:
immersing a mold having both a gelatinizer impermeability or a slight gelatinizer impermeability and a hardening agent permeability in a hardening agent and taking out the mold from the hardening agent in advance and thereby retaining the hardening agent in said mold;
injecting a gelatinizer and an object to be sealed in the mold;
permeating said hardening agent throughout said mold by immersing the mold again in the hardening agent; and
hardening the gelatinizer around the object to be sealed uniformly from the contacting part with the mold and thereby making it possible for the object to be sealed to be easily released from the mold as a gel-coated object.

10. A gel coating apparatus comprising:
a mold which has both a gelatinizer impermeability or a slight gelatinizer impermeability and a hardening agent permeability;
an object to be sealed feeding means for throwing a specified number of objects to be sealed into the mold;
a gelatinizer feeding means for discharging an adequate amount of gelatinizer for applying to the object to be sealed;
a hardening tank which is disposed below the gelatinizer feeding means and said object to be sealed feeding means and is filled with a hardening agent;
a mold immersing means which can consecutively immerse the molds in the hardening tank and take out the molds from the tank; and
a gel-coated object collecting means for taking out a gel-coated object which is released from the mold and moves suspending in the hardening agent from the hardening tank, wherein the gel coating apparatus immerses the mold having a gelatinizer and an object to be sealed injected in it by the object to be sealed feeding means and the gelatinizer feeding means in a hardening agent inside the hardening tank by means of the mold immersing means and thereby makes the hardening agent permeate throughout the mold to harden the surface of the gelatinizer in the mold and releases the gel-coated object from the mold.

11. The gel coating apparatus according to claim 10, wherein said gel-coated object collecting means comprises two pulleys arranged in the longitudinal direction, a belt wound around the pulleys, and a plurality of paddles stood upright on the outer face of the belt, and the paddles are moved through said hardening tank together with the belt by rotation of the pulleys, generate a circulating flow, transfer a gel-coated object suspending in the liquid surface, and scoop up and discharge a gel-coated object transferred to the terminal to the outside.

12. The gel coating apparatus according to claim 10, wherein said mold immersing means comprises an upper pulley arranged near said gelatinizer feeding means and said object to be sealed feeding means and near the liquid surface of the hardening agent in said hardening tank, a lower pulley arranged distantly from the upper pulley and deeply in the hardening agent, and a mold built-in belt wound around the upper and lower pulleys, and the mold built-in belt has a plurality of molds whose openings face outward embedded in it.

* * * * *